US006807036B2

(12) United States Patent
Baldwin

(10) Patent No.: US 6,807,036 B2
(45) Date of Patent: Oct. 19, 2004

(54) DIGITAL FAULT INTERRUPTER WITH SELF-TESTING CAPABILITIES

(75) Inventor: John R. Baldwin, Newtown, CT (US)

(73) Assignee: Hubbell Incorporated, Orange, CT (US)

( * ) Notice: Subject to any disclaimer, the term of this patent is extended or adjusted under 35 U.S.C. 154(b) by 131 days.

(21) Appl. No.: 10/087,125

(22) Filed: Mar. 4, 2002

(65) Prior Publication Data

US 2002/0181175 A1 Dec. 5, 2002

Related U.S. Application Data

(60) Provisional application No. 60/286,372, filed on Apr. 26, 2001, and provisional application No. 60/312,344, filed on Aug. 16, 2001.

(51) Int. Cl.[7] ............................................. H02H 3/00
(52) U.S. Cl. ....................................................... 361/42
(58) Field of Search ........................... 361/42–50, 93.1, 361/93.2, 93.4, 93.5, 93.6, 71–73

(56) References Cited

U.S. PATENT DOCUMENTS

| 3,932,790 A | 1/1976 | Muchnick .................... 317/18 |
| 3,936,699 A | 2/1976 | Adams ........................ 317/18 |
| 3,976,918 A | 8/1976 | Clark ....................... 317/18 D |
| 4,024,436 A | 5/1977 | Adams ........................ 361/45 |
| 4,045,822 A | 8/1977 | Schade, Jr. .................. 361/45 |
| 4,063,299 A | 12/1977 | Munroe ....................... 361/45 |
| 4,345,289 A | 8/1982 | Howell ....................... 361/45 |
| 4,368,498 A | 1/1983 | Neuhouser .................... 361/48 |
| 4,412,193 A | 10/1983 | Bienwald et al. ............. 335/18 |
| 4,538,040 A | 8/1985 | Ronemus et al. ............. 200/159 |
| 4,567,544 A | 1/1986 | Ronemus et al. ............. 361/399 |
| 4,568,997 A | 2/1986 | Bienwald et al. ............. 361/45 |
| 4,574,324 A | 3/1986 | Packard ....................... 361/46 |
| 4,595,894 A | 6/1986 | Doyle et al. ................. 335/18 |
| 4,618,907 A | 10/1986 | Leopold ...................... 361/45 |
| 4,709,293 A | 11/1987 | Gershen et al. ............... 361/50 |
| 4,742,422 A | 5/1988 | Tigges ........................ 361/45 |
| 4,802,052 A | 1/1989 | Brant et al. .................. 361/42 |
| 4,831,496 A | 5/1989 | Brant et al. ................ 361/394 |
| 4,872,087 A | 10/1989 | Brant ....................... 361/356 |
| 4,939,615 A | 7/1990 | Brant et al. .................. 361/42 |
| 5,166,853 A | 11/1992 | Gershen et al. ............... 361/50 |
| 5,184,271 A | 2/1993 | Doyle et al. ................. 361/49 |
| 5,202,662 A | 4/1993 | Bienwald et al. ............. 335/18 |
| 5,223,810 A | 6/1993 | Van Haaren ................. 335/18 |
| 5,270,896 A | 12/1993 | McDonald .................... 361/45 |
| 5,270,897 A | 12/1993 | McDonald et al. ........... 361/45 |
| 5,334,939 A | 8/1994 | Yarbrough .................. 324/424 |
| 5,363,269 A | 11/1994 | McDonald .................... 361/45 |
| 5,402,298 A | 3/1995 | Gershen et al. ............... 361/50 |
| 5,406,436 A | 4/1995 | Doyle et al. ................. 361/50 |
| 5,418,678 A | 5/1995 | McDonald .................... 361/46 |
| 5,477,412 A | 12/1995 | Neiger et al. ................. 361/45 |
| 5,510,760 A | 4/1996 | Marcou et al. ............... 335/18 |
| 5,541,800 A | 7/1996 | Misencik ..................... 361/45 |

(List continued on next page.)

FOREIGN PATENT DOCUMENTS

| DE | 4205208 | 8/1993 | ............ H02H/3/33 |
| WO | 0074192 | 12/2000 | ............ H02H/3/00 |

OTHER PUBLICATIONS

"RV4145A Low Power Ground Fault Interrupter", Product Specification Revision 1.0.2, Fairchild Semiconductor Corporation (1998), no month.

* cited by examiner

*Primary Examiner*—Ronald Leja
(74) *Attorney, Agent, or Firm*—Alfred N. Goodman; John E. Holmes; Stacey J. Longanecker

(57) ABSTRACT

A ground fault interrupter apparatus is provided that employs a switching device that is operated in two stages. The first stage operates a solenoid in order to close the contacts and preferably provides coupling between the load and the power source. The second stage maintains the coupling, however, drawing less current and power from the internal devices of the apparatus. Accordingly, the fault interrupter meets various standards for the time required to open and close the contacts as well as keeping the dissipated heat from the device within the required range.

24 Claims, 5 Drawing Sheets

U.S. PATENT DOCUMENTS

| | | | |
|---|---|---|---|
| 5,546,263 A | 8/1996 | Doyle et al. ................... 361/50 |
| 5,568,344 A | 10/1996 | Gernhardt et al. ............ 361/42 |
| 5,583,730 A | 12/1996 | Gershen et al. ............... 361/50 |
| 5,594,398 A | 1/1997 | Marcou et al. ............... 335/18 |
| 5,600,524 A | 2/1997 | Neiger et al. ................. 361/42 |
| 5,638,243 A | 6/1997 | Torezan et al. ............... 361/42 |
| 5,654,857 A | 8/1997 | Gershen ....................... 361/42 |
| 5,661,623 A | 8/1997 | McDonald et al. ........... 361/42 |
| 5,680,287 A | 10/1997 | Gernhardt et al. ............ 361/42 |
| 5,684,272 A | 11/1997 | Gernhardt et al. ............ 174/65 |
| 5,701,080 A | 12/1997 | Schumacher et al. ........ 324/539 |
| 5,706,155 A | 1/1998 | Neiger et al. ................. 361/45 |
| 5,715,125 A | 2/1998 | Neiger et al. ................. 361/42 |
| 5,729,417 A | 3/1998 | Neiger et al. ................. 361/45 |
| 5,747,980 A | 5/1998 | Gershen ....................... 323/356 |
| 5,757,598 A | 5/1998 | Aromin ....................... 361/49 |
| 5,768,079 A | 6/1998 | Buell ........................... 361/78 |
| 5,781,387 A | 7/1998 | Doyle et al. ................... 361/49 |
| 5,786,971 A | 7/1998 | Chan et al. ................... 361/42 |
| 5,793,587 A | 8/1998 | Boteler ........................ 361/42 |
| 5,801,912 A | 9/1998 | Gershen et al. ............... 361/50 |
| 5,825,599 A | 10/1998 | Rosenbaum ................. 361/45 |
| 5,841,615 A | 11/1998 | Gershen ....................... 361/42 |
| 5,864,455 A | 1/1999 | Gernhardt et al. ............ 361/42 |
| 5,894,392 A | 4/1999 | McDonald ................... 361/42 |
| 5,917,686 A | 6/1999 | Chan et al. ................... 361/42 |
| 5,936,817 A * | 8/1999 | Matsko et al. ................ 361/72 |
| 5,946,173 A | 8/1999 | Packard et al. ................ 361/42 |
| 5,963,406 A | 10/1999 | Neiger et al. ................. 361/42 |
| 5,963,408 A | 10/1999 | Neiger et al. ................. 361/45 |
| 6,016,244 A | 1/2000 | Gershen et al. ............... 361/50 |
| 6,021,034 A | 2/2000 | Chan et al. ................... 361/42 |
| 6,040,967 A | 3/2000 | DiSalvo ....................... 361/42 |
| 6,052,265 A | 4/2000 | Zaretsky ...................... 361/42 |
| 6,052,266 A * | 4/2000 | Aromin ....................... 361/49 |
| 6,075,368 A | 6/2000 | Schumacher et al. ........ 324/539 |
| 6,088,205 A | 7/2000 | Neiger et al. ................. 361/42 |
| 6,097,580 A | 8/2000 | Zaretsky ...................... 361/42 |
| 6,111,733 A | 8/2000 | Neiger et al. ................. 361/42 |
| 6,128,169 A | 10/2000 | Neiger et al. ................. 361/42 |
| 6,144,537 A | 11/2000 | Boteler ........................ 361/42 |
| 6,176,717 B1 | 1/2001 | Campolo et al. ........... 439/181 |
| 6,198,611 B1 | 3/2001 | Macbeth ...................... 361/42 |
| 6,199,264 B1 | 3/2001 | Marcou et al. ............... 29/593 |
| 6,226,161 B1 | 5/2001 | Neiger et al. ................. 361/45 |
| 6,246,558 B1 | 6/2001 | DiSalvo et al. ............... 361/42 |
| 6,252,407 B1 | 6/2001 | Gershen ....................... 324/509 |
| 6,262,871 B1 | 7/2001 | Nemir et al. .................. 361/42 |
| 6,266,219 B1 | 7/2001 | Macbeth et al. .............. 361/42 |
| 6,282,070 B1 | 8/2001 | Ziegler et al. ................ 361/42 |
| 6,288,882 B1 | 9/2001 | DiSalvo et al. ............... 361/42 |
| 6,309,248 B1 | 10/2001 | King .......................... 439/535 |
| 6,339,525 B1 | 1/2002 | Neiger et al. ................. 361/42 |
| 2001/0033468 A1 | 10/2001 | MacBeth ..................... 361/42 |

* cited by examiner

DIGITAL FAULT INTERRUPTER WITH SELF-TESTING CAPABILITIES

The present invention claims benefit under 35 U.S.C. §119(e) of a provisional U.S. patent application of John R. Baldwin entitled "Fault Interrupter Using Microprocessor for Fault Sensing and Automatic Self-Testing", Ser. No. 60/286,372, filed Apr. 26, 2001, and of a provisional U.S. patent application of John R. Baldwin entitled "Digital GFCI", Ser. No. 60/312,344, filed Aug. 16, 2001, the entire contents of said provisional applications being expressly incorporated herein by reference.

CROSS-REFERENCE TO RELATED APPLICATION

Related subject matter is disclosed in a co-pending U.S. patent application of John R. Baldwin et al., filed on Nov. 28, 2000, Ser. No. 09/722,423, entitled "Fault Interrupter Using Microprocessor for Fault Sensing and Automatic Self-Testing", the entire contents of said application being expressly incorporated herein by reference.

FIELD OF THE INVENTION

The present invention relates generally to a fault interrupting device, such as a ground fault circuit interrupter or an arc fault circuit interrupter.

BACKGROUND OF THE INVENTION

Fault interrupting devices are designed to trip in response to the detection of a fault condition at an AC load. The fault condition can result when a person comes into contact with the line side of the AC load and an earth ground at the same time, a situation which can result in serious injury. A ground fault circuit interrupter (GFCI) detects this condition by using a sense transformer to detect an imbalance between the currents flowing in the line and neutral conductors of the AC supply, as will occur when some of the current on the line side is being diverted to ground. When such an imbalance is detected, a relay or circuit breaker within the GFCI device is immediately tripped to an open condition, thereby removing all power from the load. Many types of GFCI devices are capable of being tripped not only by contact between the line side of the AC load and ground, but also by a connection between the neutral side of the AC load and ground. The latter type of connection, which may result from a defective load or from improper wiring, is potentially dangerous because it can prevent a conventional GFCI device from tripping at the intended threshold level of differential current when a line-to-ground fault occurs.

A ground fault is not the only class of potentially dangerous abnormal operating conditions. Another type of undesirable operating condition occurs when an electrical spark jumps between two conductors or from one conductor to ground. This spark represents an electrical discharge through the air and is objectionable because heat is produced as an unintentional by-product of this unintentional "arcing" path. Such arcing faults are a leading cause of electrical fires. Arcing faults can occur in the same places that ground faults can occur; in fact, a ground fault would be called an arcing fault if it resulted in an electrical discharge, or spark, across an air gap. A device known as an arc fault circuit interrupter (AFCI) can prevent many classes of arcing faults.

Some GFCI devices employ a microprocessor in conjunction with a conventional GFCI chip to perform self-testing functions. These GFCI devices typically provide distinct functions for each I/O port of the microprocessor. However, maximum temperature rise requirements are in place requiring the maximum temperature rise requirement to be lower in GFCI and AFCI devices. In order to meet these requirements while maintaining a low cost device, a need exists for a microprocessor within the GFCI or AFCI device to be able to receive a plurality of different inputs at a single I/O port of the microprocessor. By requiring fewer I/O ports, a smaller microprocessor can be used and heat dissipation can be reduced.

Additional UL requirements allow for a maximum time period within which the load must be disconnected from the power supply in the event of a ground fault or arc fault. Some conventional GFCI and AFCI devices disconnect the load by de-energizing a solenoid to open contacts that had previously coupled the load to the AC supply. However, this arrangement dissipates excessive heat and may not be capable of opening the contacts within the time prescribed. Accordingly, a need exists for a novel circuit which continuously energizes the solenoid to maintain the contacts in a closed position, without generating excessive heat in the device.

Although GFCI and AFCI devices can provide useful protection against electrical hazards, they may inadvertently create potentially dangerous situations. For example, if a ground fault circuit interrupter is inadvertently powered through its load or feed-through terminals rather than through its line or input terminals, the GFCI will trip normally when confronted with a ground fault condition but the load plugged into the GFCI receptacle will not be disabled. The miswiring may not be detected because electrical power is usually provided to the GFCI face receptacles some time after installation. Accordingly, the GFCI will remain incorrectly wired unless the installer is able to immediately detect the miswiring condition. Therefore, a need exists for a device that removes power from a receptacle coupled to a GFCI or AFCI, as well as all downstream receptacles, in the event that a miswiring condition occurs.

SUMMARY OF THE INVENTION

According to one aspect of the present invention, a fault interrupter comprises a first and second input terminals for connection to the line and neutral terminals, respectively, of a power source; first and second output terminals for connection to the line and neutral terminals, respectively, of a load; and first and second conductive paths extending, between the first and second input terminals and the first and second output terminals; first and second contact sets for completing and interrupting the first and second conductive paths, respectively; an actuator for operating the first and second contact sets; and a first and second electronic switching device coupled to the actuator, the first electronic switching device being adapted to energize the actuator for a selected period of time, the second electronic switching device being adapted to energize the actuator after the first electronic switching device ceases operation.

In accordance with a second aspect of the present invention provides a fault interrupter apparatus comprises first and second input terminals for connection to the line and neutral terminals, respectively, of a power source; first and second output terminals for connection to the line and neutral terminals, respectively, of a load; first and second conductive paths extending, between the first and second input terminals and the first and second output terminals; first and second contact sets for completing and interrupting the first and second conductive paths, respectively; a fault sensing circuit adapted to produce a fault signal in response to the detection of a fault condition at the load; and a processing device coupled to an output of the fault sensing circuit for receiving the fault signal and for operating the first and second contact sets to open the respective first and second conductive paths.

In accordance with a third aspect of the present invention, a fault interrupter apparatus comprises first and second input terminals for connection to the line and neutral terminals, respectively, of a power source; first and second output terminals for connection to the line and neutral terminals, respectively, of a load; first and second conductive paths extending, between the first and second input terminals and the first and second output terminals; first and second contact sets for completing and interrupting the first and second conductive paths, respectively; and a processing device for operating the first and second contact sets in response to a plurality of input signals, wherein a single input of said processing device is adapted to receive more than one of said input signals.

In accordance with a fourth aspect of the present invention a fault interrupter apparatus comprises first and second input terminals for connection to the line and neutral terminals, respectively, of a power source; first and second output terminals for connection to the line and neutral terminals, respectively, of a load; first and second conductive paths extending, between the first and second input terminals and the first and second output terminals; first and second contact sets for completing and interrupting the first and second conductive paths, respectively; and a controller for operating the first and second contact sets in response to the detection of a fault condition at the load, the controller being operative to periodically open the first and second contact sets, to monitor a voltage at the load to verify that the first and second contact sets have opened, and to re-close the first and second contact sets after a predetermined period of time after verifying that the first and second contact sets have re-closed, the predetermined period of time being extended by the controller if the first and second contact sets have not re-closed within the predetermined period of time.

The present invention is also directed to methods which can be used in connection with the fault interrupting apparatus described above.

BRIEF DESCRIPTION OF THE DRAWINGS

These and other aspects, advantages and novel features of the invention will be more readily appreciated from the following detailed description when read in conjunction with the accompanying drawings, in which.

DETAILED DESCRIPTION OF THE PREFERRED EMBODIMENT

Figure 1:
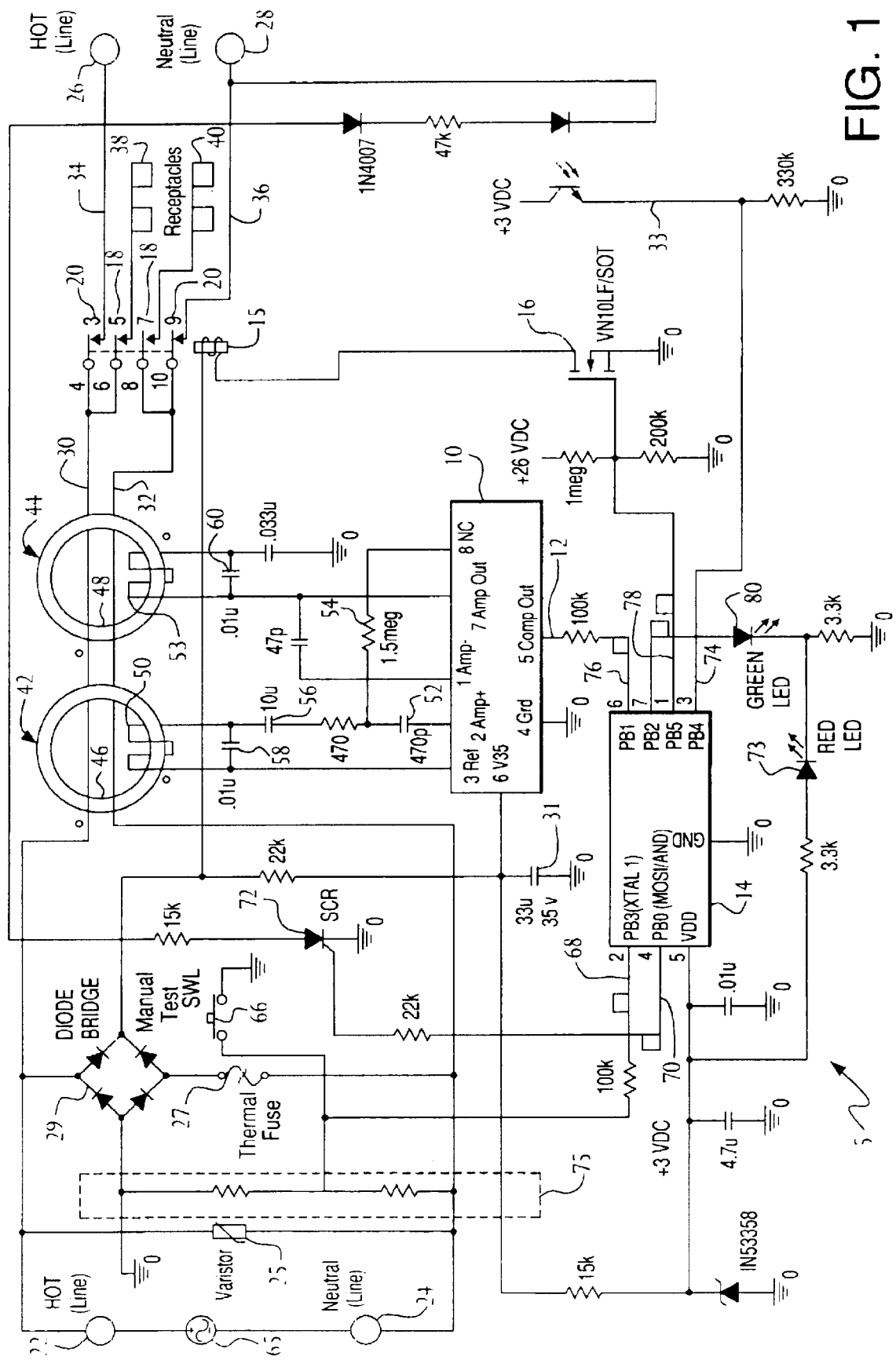
FIG. 1 is a schematic diagram of a ground fault circuit interrupter in accordance with a first embodiment of the present invention, in which a conventional GFCI chip is employed in combination with a microprocessor to operate the GFCI with a single I/O port of the microprocessor providing multi-input capabilities.

FIG. 1 illustrates a receptacle-type ground fault circuit interrupter (GFCI) 5 constructed in accordance with a first embodiment of the present invention. The GFCI 5 employs a GFCI chip 10 with an output 12 to a microprocessor 14. Microprocessor 14 is preferably a Type PIC12C67X or PIC12F629 microprocessor manufactured by Microchip, located in Chandler, Ariz. A field effect transistor (FET) 16 is powered, via the microprocessor 14, to energize solenoid 15 thus closing contacts 18 and 20 to establish a conductive path between line terminals 22 and 24 and faceplate receptacles 38 and 40 and load or feedthrough terminals 26 and 28.

The GFCI 5 employs four sets of contacts, namely contact sets 18 and 20 in order to remove power from the face receptacles 38 and 40, as well as any potential downstream receptacles, via wiring from load or feed-through terminals 26 and 28. The contacts 18 and 20 are opened and closed simultaneously by a solenoid 15 preferably having specifications as detailed in the attached Appendix. A suitable solenoid 15 is available from Scientific Generics, located in Cambridge, England having a footprint of about 0.640 square inch, an aspect ratio of about 0.995, and dimensions of about 0.300 inch in height, 0.804 inch in width, and 0.800 inch in length. An alternative solenoid 15 is available from Bicron Electronics located in Canaan, Conn. having a footprint of about 0.650 square inch, an aspect ratio of about 1.500, and dimensions of about 0.650 inch in height, 0.650 inch in width, and 1.00 inch in length.

The detection of a ground fault condition at a load connected to one of the face receptacles 38, 40 or to the feedthrough terminals 26 and 28, is implemented by a current sense transformer 42 and a grounded neutral detection transformer 44, the GFCI chip 10 which has a direct input into the microprocessor 14 via line 12, as well as other interconnecting components. The GFCI chip 10 is preferably a Type RV4145N integrated circuit manufactured by Fairchild Semiconductor, located in South Portland, Me. The GFCI chip 10 and the microprocessor 14 are powered from the AC input terminals 22 and 24 by means of a full-wave bridge rectifier 29 and filter capacitor 31. A transient voltage suppressor 25 is connected across the input terminals 22 and 24 to provide protection from voltage surges due to lightning and other transient conditions. As the transients increase, the voltage suppressor 25 absorbs heat. To prevent the voltage suppressor 25 from overheating and damaging and degrading the enclosure parts, a thermal fuse 27 is preferably provided between the power source 65 and the diode bridge 29 and varistor 25. If the temperature reaches unacceptable levels, the fuse breaks the connection between the power source 65 and the combination of the bridge 29 and a varistor 25, creating an open circuit condition, leaving the GFCI 5 inoperable for safety purposes.

Within the GFCI 5, a first conductor 30, as mentioned above, connects the AC line input terminal 22 to the load line terminal 26, and a second conductor 32 connects the AC neutral terminal 24 to the load neutral terminal 28, in a conventional manner. Additionally, when contacts 18 and 20 make connections, the AC line input terminal 22 and AC neutral terminal 24 ate coupled to the face receptacles 38 and 40. The conductors 30 and 32 pass through the magnetic cores 46 and 48 of the two transformers 42 and 44. The transformer 42 serves as a differential sense transformer for detecting a connection between the line side of the AC load and an earth ground (not shown), while the transformer 44 serves as a grounded neutral transformer for detecting a connection between the neutral side of the AC load and an earth ground. In the absence of a ground fault, the current flowing through the conductors 30 and 32 will be equal and opposite, and no net flux is generated in the core 46 of the differential sense transformer 42. In the event that a connection occurs between the line side of the AC load and ground, however, the current flowing through the conductors 30 and 32 no longer precisely cancel, and a net flux is generated in the core 46 of the transformer 42. This flux gives rise to a potential at the output of the secondary coil 50, and this output is applied to the input of the GFCI chip 10 to produce a trip signal on the output line 12. As mentioned above, this output is fed directly into the microprocessor 14, which in turn controls four sets of contacts 18 and 20, via solenoid 15, to remove the AC power from the face receptacles 38 and 40 and the load or feedthrough terminals 26 and 28.

Since the GFCI chip 10 is a commercially available component, its operation is well known to those skilled in the art, and need not be described in detail. In utilizing this device, the resistor 54 serves as a feedback resistor for setting the gain of the controller and hence its sensitivity to normal faults. Capacitors 52 and 58 provide noise filtering at the inputs of the controller. Capacitor 56 AC couples low frequency signals out of the sense transformer 42, to the GFCI chip's 10 internal operational amplifier (not shown).

It will be appreciated by those skilled in the art that the GFCI 5 should be wired with the AC source 65 at the line side 22 and 24 as opposed to the load side 26 and 28. The GFCI 5 is structured and arranged to require the electronics to be powered from the line side 22 and 24 and to provide no power to the electronics when the GFCI 5 is miswired and powered from the load side 26 and 28. In other words, if the power source 65 is connected at the hot 26 and neutral 28 terminals of the load side, no power is provided to the GFCI chip 10, the microprocessor 14 and the solenoid 15. Since the solenoid 15 is not powered, the contacts 18 and 20 are open. As such, there is no path from the load or feedthrough terminals 26 and 28 to the face receptacles 38 and 40, which is a result of the GFCI 5 comprising four sets of contacts, as opposed to two sets of contacts.

The contacts 18 and 20 are in a closed state when the solenoid 15 is energized. This state will be referred to as the normal state. However, when the solenoid 15 is not energized, the contacts 18 and 20 are in an open state and will be referred to as such.

In operation, a ground fault can occur via a manual or self-test, or an actual ground fault, for example when a person comes into contact with the line side of the AC load and an earth ground at the same time. In a manual test described in more detail below, a user presses a test button 66, thus grounding a half-wave rectified zero-cross signal ordinarily produced by the diode bridge 29 and the zero-cross voltage divider 75. This grounded signal is input into microprocessor 14 via I/O port 68. Microprocessor 14 then produces a test signal on line 70 to gate SCR 72. As is well known in the art, an SCR begins to conduct when gated and will continue to conduct as long as current flows between its anode and cathode, even after the gating signal is removed. Thus the SCR 72 creates an imbalance between the conductors 30 and 32 by allowing an imbalance of current to flow through conductors 30 and 32, thus, generating a net flux which gives rise to a potential at the output of secondary coil 50. This output is applied to the input of GFCI chip 10, which in turn signals the microprocessor 14 via line 12. The microprocessor 14 de-energizes the solenoid 15 from a normal or on state to an off state, and the contacts 18 and 20 are moved from the normally closed state to an open condition, thereby removing power from the face receptacles 38 and 40 and from the load or feedthrough terminals 26 and 28. The microprocessor 14 opens the contacts 18 and 20 momentarily (preferably for a period of time not to exceed 20 msec., in order to avoid disrupting the load during a manual or self test.

The contacts 18 and 20 open within 20 msec, as specified by various standards, for example by the Information Technology Technical Industry Council (ITIC) in Washington DC. The microprocessor 14 directly tests the load voltage, via opto-isolater 33 to determine whether the contacts 18 and 20 have opened. If an inductive load is coupled to the GFCI 5, the microprocessor 14 continues to see a voltage at opto-isolater 33 due to the fact that an inductive load tends to maintain a voltage at the face receptacles 38 and 40 of the GFCI 5 for a longer period of time than a non-inductive load, despite the contacts 18 and 20 having opened. Accordingly, the microprocessor 14 de-energizes the contacts 18 and 20 for a longer period of time (preferably about 66.8 msec.) to ensure that any residual voltage is low enough such that it is undetectable at the load. If the microprocessor 14 determines that a voltage is still present after the longer period of time mentioned above, it illuminates a red LED 73 as an external alarm indicator.

Maintaining low current consumption is important due to UL lead temperature rise requirements at the load 26 and 28. As such, I/O ports of the microprocessor 14 can provide multiple functions. For example, the manual test button 66 shares an I/O port 68 with a voltage zero cross detection circuit via voltage divider 75. The voltage zero cross detection circuit allows the microprocessor to determine when the incoming rectified sinusoidal signal is approaching a zero crossing. This enables the microprocessor 14 to close or open the contacts 18 and 20 at the zero crossing of an incoming AC signal, thus minimizing arcing at any of the contacts 18 and 20.

The microprocessor 14 is able to share the I/O port 68 with the two functions by reading the state of pin 74 to determine whether a line voltage is present. If the microprocessor 14 senses a loss of line voltage on port 68, yet detects no load voltage present on port 74, then the user has depressed the manual test button 66. This is due to the fact that port 68 typically receives an input from voltage divider 75 that is representative of a half-wave rectified AC signal. Accordingly, when the manual test button 66 is depressed, the half-wave signal becomes zero, and the microprocessor 14 determines that the test button 66 has been depressed. Under normal operation, the microprocessor 14 employs the input for zero cross detection function, via voltage divider 75, and processes it accordingly. The sharing of input ports on the microprocessor 14 allows for the use of a smaller and less complex microprocessor, which lowers power consumption and emitted heat.

The automatic self-test, mentioned briefly above, is performed on a periodic basis, for example daily, weekly or monthly. The microprocessor 14 maintains a software record of the current state of the contacts 18 and 20 (i.e., either open or closed) and conducts an automatic self-test only if normal operation is in progress with the contacts 20 closed. During a self-test, pin 70 is brought high by the microprocessor 14 to drive the SCR 72 gate for 20 msec. Pin 76 looks for a $\geq 2.5$ volt, 3.8 ms pulse from the GFCI chip 10 every 16.7 ms. When pin 76 receives a pulse, pin 78 is asserted low by the microprocessor 14 for 20 ms to open the contacts 18 and 20 momentarily, for example 20 msec. The microprocessor 14 checks pin 74 for a low signal for 20 msec. indicating that the contacts opened for 20 msec and then re-closed.

Conventional GFCI devices open the contacts when the test button is activated and closes the contacts only when a reset button is activated.

However, the GFCI 5 does not employ a reset button, rather the contacts 18 and 20 open and then re-close automatically, after which the GFCI 5 returns to normal operation., the microprocessor 14 flashes the green LED 80. If the automatic test fails (i.e., if the GFCI chip 10 did not produce the required output, or if the contacts 20 did not open and re-close), the software is programmed to open the contacts 18 and 20 and flash the red LED 73. An audible warning can also be added. If the user, depresses the manual test button two times, thus indicating a reset, the contacts will close. However, if a ground fault exists, the microprocessor opens contacts 18 and 20 despite the user depressing the manual test button twice.

Turning now to the details of the manual test feature of device 5, briefly mentioned above, when the contacts 18 and 20 are closed, then the manual test is implemented by momentarily activating the manual test button 66. When the manual test button 66 is activated, the microprocessor 14 senses momentary loss of the zero cross circuit 75 function. Since the contacts 18 and 20 are closed (as sensed by pin 74), the microprocessor 14 can check that a line voltage is still present by checking that the pin 74 input is high, and can initiate a ground fault current via pin 70 and SCR 72. The microprocessor 14 is continuously looking for an output from the GFCI chip 10 on pin 76. When a ground fault begins, the GFCI chip 10 puts out a pulse ($\geq 2.5$ volt for 3.8 ms) every 16.7 ms on output 12. When pin 76 detects this pulse from the GFCI chip 10, the microprocessor 14 asserts pin 78 low for 20 ms to momentarily open the contacts 18 and 20 via FET 16. When pin 78 goes low, the microprocessor 14 checks for a continuous zero voltage on pin 74 indicating the contacts 18 and 20 have opened. Pin 74 monitors an output from opto-isolater 33 to determine if a voltage exists. If the contacts 18 and 20 have not opened, then pin 74 has a continuous half-wave rectified signal. If the contacts 18 and 20 have opened for 20 msec., then pin 74 was low, the green LED 80 flashes and the device 5 passes. However, if pin 74 did not remain continuously at zero for 20 msec., the device 5 fails. The software maintains the contacts 18 and 20 open and flashes the red LED 73. At this point, the user can press the manual test button 37 a second time. The microprocessor 14 interprets the user pressing the manual test button 66 twice as a reset command and repeats the test by having the microprocessor 14 assert pin 78 low for 20 msec. to momentarily open the contacts 18 and 20 via FET 16, and repeats the above steps. If the test passes, the microprocessor 14 closes the contacts 18 and 20. However, if this second test (i.e., depressing the manual test button a second time) fails, the microprocessor 14 does not close contacts 18 and 20.

Alternatively, the software of the microprocessor 14 allows the first push of the manual test button 66 to open the contacts 18 and 20 for an extended period of time. The second push of the manual test button 66 would re-close contacts 18 and 20.

With continued reference to FIG. 1, the operation of the microprocessor 14 facilitates operation of GFCI device 5 when a line voltage brown-out or a line voltage drop-out occurs. A brown-out situation occurs when the microprocessor 14 has sufficient supply voltage to enable the microprocessor 14, yet the GFCI device 5 has insufficient voltage to operate the solenoid 15 in order to maintain power to the face receptacles 38 and 40. When the line voltage drops below the solenoid 15 hold-in voltage, the solenoid 15 de-energizes and the contacts 18 and 20 open. The drop-out of the line voltage is detected by monitoring the zero cross circuit 75 via pin 68 and the load voltage via pin 74. Accordingly, when the zero-cross function drops below a threshold voltage, a brown-out situation occurs.

The microprocessor 14 has an internal Power On Reset (POR) circuit which holds the microprocessor in reset until $V_{CC}$ from the power source 65 rises above 2.1 volts. Selecting a lower than 2.1 volts BOD trigger level allows the maximum time after a line voltage drop or sag before the microprocessor 14 is reset.

Accordingly, two main scenarios can occur. For example, if a line voltage drop-out lasts long enough for $V_{CC}$ to drop below 2.1 volts, then the contacts 18 and 20 open and the microprocessor 14 enters reset mode, wherein the microprocessor ceases functioning, and then goes through the normal start up process. In addition, if a line voltage brown-out lasts long enough or drops the line voltage low enough for the solenoid 15 to de-energize but not for the microprocessor 14 to be reset, then the software maintains drive to FET 16 via pin 78 until the line voltage is sufficiently re-established to operate the solenoid 15 and re-close the contacts 18 and 20. If the contacts 18 and 20 were not closed, the mode of operation of the microprocessor 14 prior to the brown-out is continued.

If a ground fault exists prior to a line voltage drop-out, when the GFCI 5 re-starts the normal warm-up proceeds. Following a 10 second warm-up, for example, the microprocessor 14 asserts pin 78 high to energize the solenoid 15 and close the contacts 18 and 20. When the contacts 18 and 20 close, if the ground fault still exists, the GFCI chip 10 sends a pulse to pin 76 and the microprocessor 14 de-energizes the solenoid 15 and opens the contacts 18 and 20.

The microprocessor 14 is configured with all 6 pins configured as input/output I/O's ports. With this programmed configuration, not only does pin 42 have external interrupt capability, but the remaining 5 pins have programmable interrupt pin change capability that allows one pin to take on the functions of another pin.

In an additional embodiment of the present invention, the microprocessor 14 software permits either a manual test only (no automatic test), or to monitor the load current and then conduct the automatic test only when the load current is zero or very low.

Figure 2:
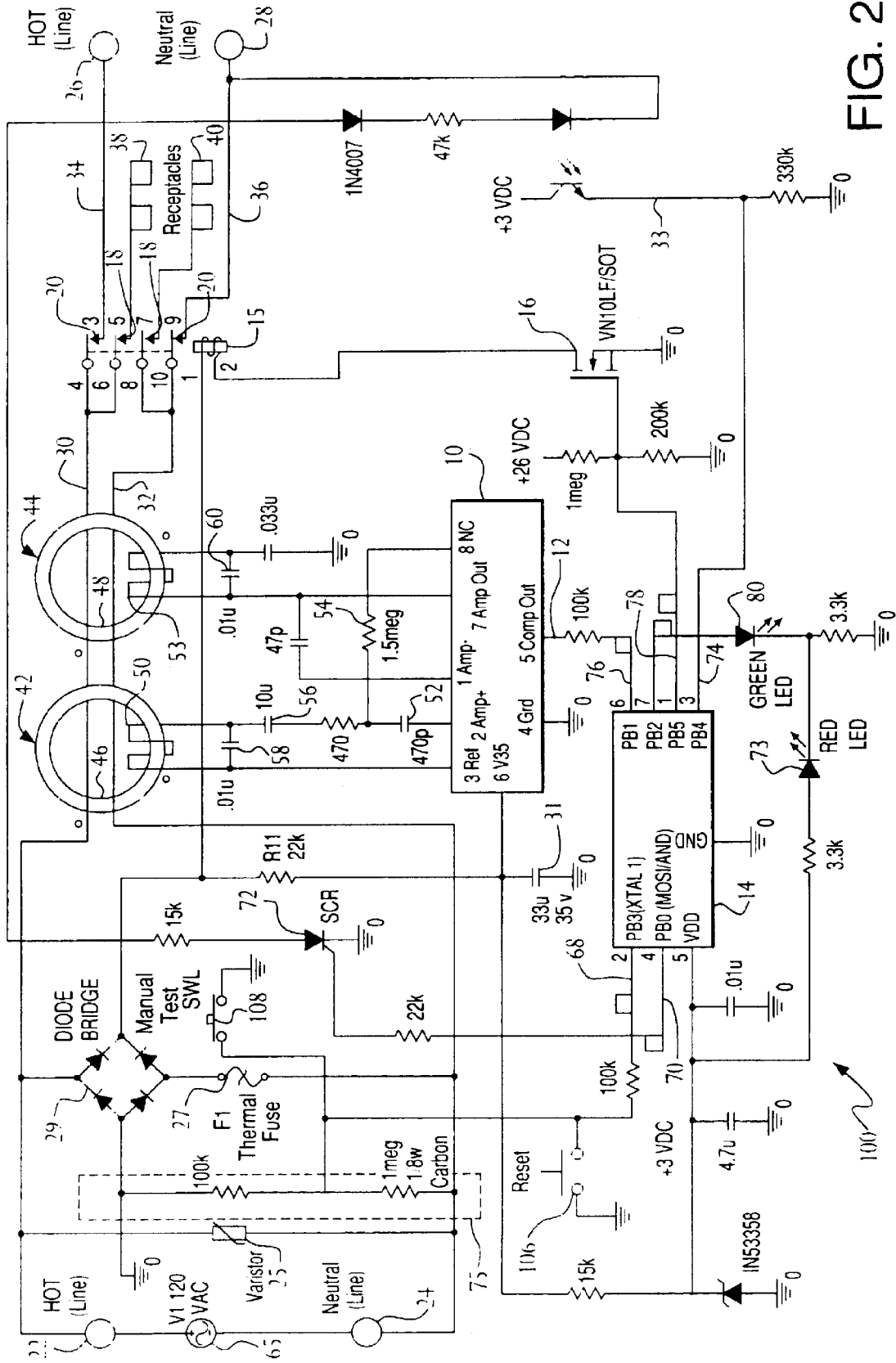
FIG. 2 is a schematic diagram of a ground fault circuit interrupter in accordance with a second embodiment of the present invention, similar to the first embodiment of FIG. 1, but additionally providing a manual test switch in parallel with an SCR employed by the microprocessor to provide a simulated ground fault, and further comprising a reset button in series with the single I/O port of the microprocessor providing multi-input capabilities.

FIG. 2 illustrates a second embodiment of the GFCI 100 with an external reset button 106. The reset button 106 allows the solenoid 15 to be re-energized, thereby returning the contacts 18 and 20 to a normal or closed state. The zero cross detection circuit 75 and the reset button 106 share a common I/O port 68 on microprocessor 14 as in the GFCI 5 of FIG. 1.

An additional modification in the embodiment of FIG. 2 is the location of the manual test button 108 which is connected in parallel with the SCR 72. In operation, when the manual test button 108 is depressed, it creates a shunt across SCR 72 and generates a simulated ground fault current that is detected by the GFCI chip 10. The manual test then proceeds as described above in connection with the manual test of FIG. 1.

In the embodiment of FIG. 2, microprocessor 14 cannot distinguish between a manual test and an actual ground fault due to the location of the manual test button 108. Accordingly, the microprocessor 14 cannot be reset automatically after a manual test, as was possible in the embodiment of FIG. 1. Nor can the manual test button be depressed twice to initiate a reset as in FIG. 1 because the second press of the manual test button is indistinguishable from an actual ground fault condition. Therefore, a reset button 106 is provided. The components and operation of the GFCI 100 of FIG. 2 are similar in all other respects to the GFCI 5 of FIG. 1.

Figure 3:
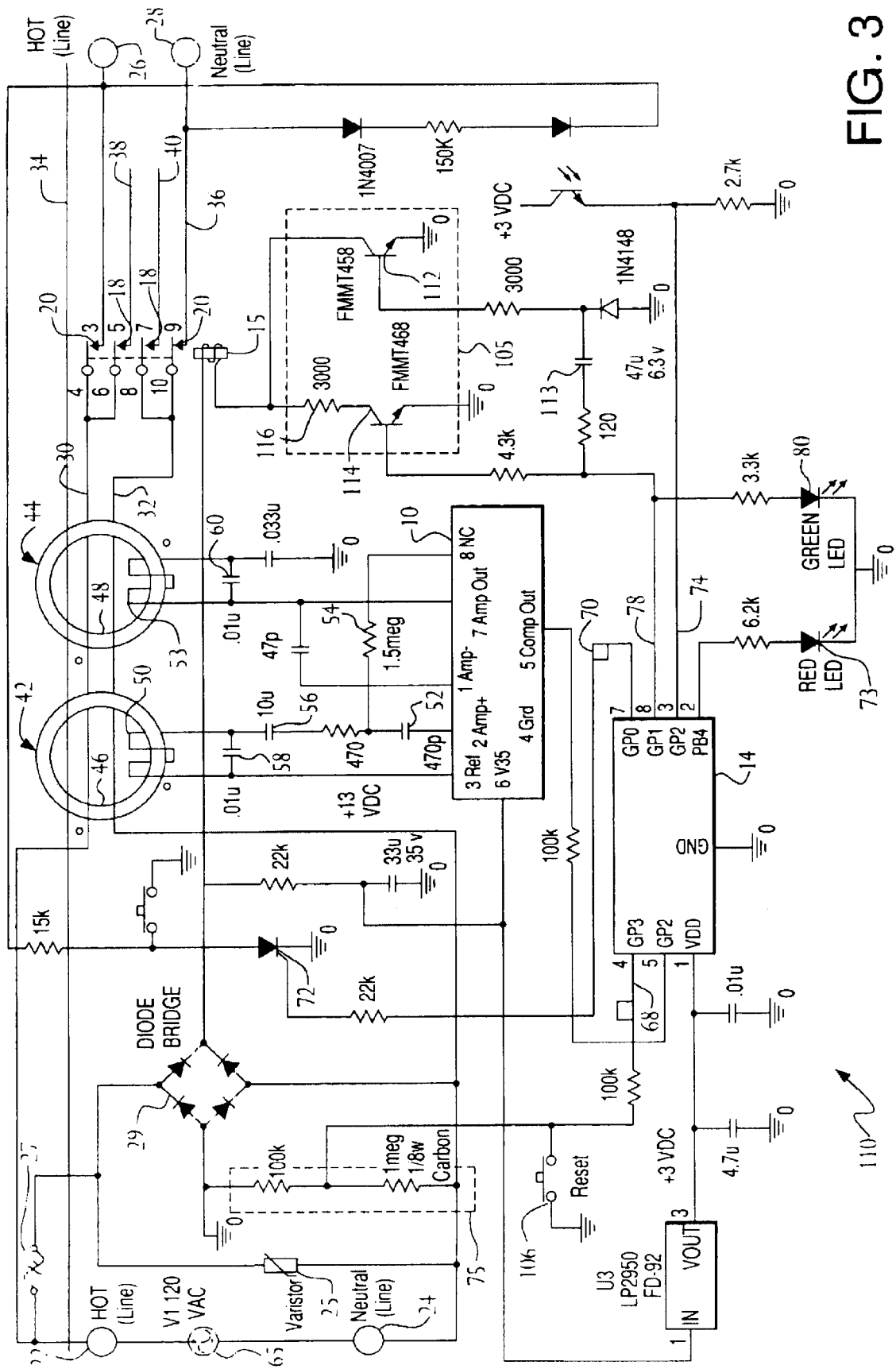
FIG. 3 is a schematic diagram of ground fault circuit interrupter in accordance with a third embodiment of the present invention, similar to the second embodiment of FIG. 2, which employs a dual drive circuit in order to operate a solenoid within the GFCI.

FIG. 3 illustrates a GFCI 110 with a dual drive circuit 105 to energize solenoid 15 to close the contacts 18 and 20 within 20 msec. as prescribed by typical standards for electrical equipment. The dual drive circuit 105 comprises transistors 112 and 114 along with resistor 116. The remainder of the components of FIG. 3 are the same and described in detail above in connection with FIG. 2.

In operation, the GFCI 110 operates in all three modes, namely, self test, automatic test, and actual ground fault, in the same fashion as FIG. 2. However, GFCI 110 energizes the solenoid 15 via the dual drive circuit 105. When microprocessor 14 drives the solenoid 15 via line 78, transistor 112 turns on and draws in the solenoid 15 plunger to allow the contacts 18 and 20 to be closed in a normal state. No current flows through transistor 114 because transistor 112 has shunted current from transistor 114. As capacitor 113 becomes fully charged, it shuts off current flow to transistor 112 and allows it to turn off. Substantially simultaneously, transistor 114 is turned on, in the second mode of operation, and maintains solenoid 15 in a normal state with its current output diminished due to series resistor 116. The purpose of this dual mode of operation is to allow the GFCI 110 to run cooler by driving solenoid 15 with an initially high current (resulting from the absence of a current limiting resistor in the collector circuit of transistor 112) to draw in the solenoid plunger to close the contacts 18 and 20, then dissipating less current via transistor 114 which is current limited, via resistor 116. Accordingly, this dual mode allows for higher power dissipation by transistor 112 to initially actuate solenoid 15, but requires less power dissipation to maintain the solenoid 15 in the current state, via transistor 114. The solenoid 15 available from Bicron Electronics, described above, is operable with the dual drive circuit 105 of FIG. 3. The decreased power provided by transistor 114 is sufficient to maintain operation of this solenoid.

Figure 4:
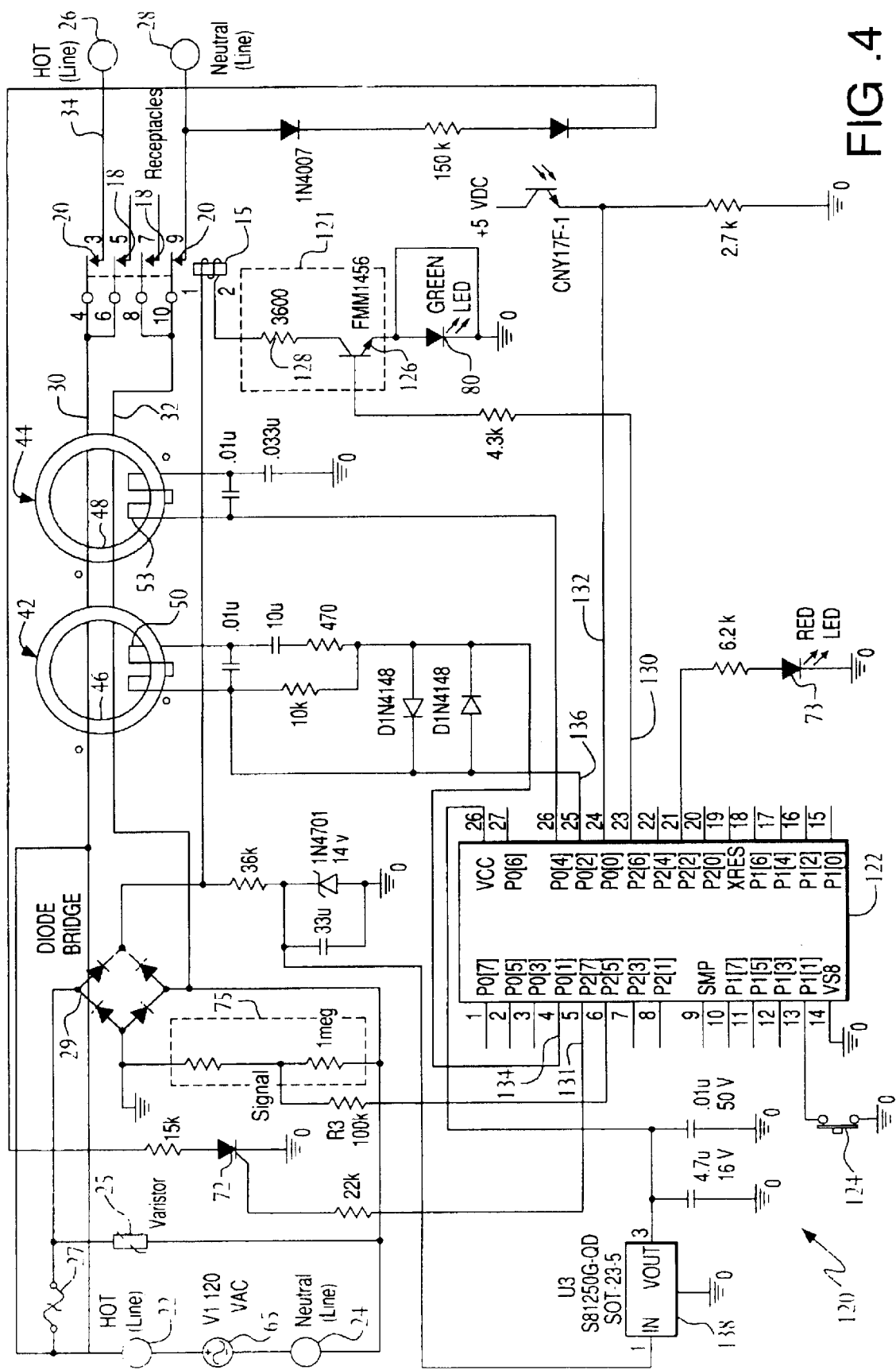
FIG. 4 is a schematic diagram of ground fault circuit interrupter in accordance with a fourth embodiment of the present invention, which employs a microprocessor that incorporates the functions of a conventional GFCI chip, and which employs a single drive circuit in order to operate a solenoid within the GFCI.

FIG. 4 illustrates a GFCI 120 that employs a microprocessor 122 both for detecting ground faults, and for conducting self-tests. The GFCI 120 does not employ a separate GFCI chip 10, as do the embodiments of FIGS. 1–3; rather, the functions of the GFCI chip are incorporated into the microprocessor 122. The microprocessor 122 is preferably a Type CYC26233 or CY8C26443 microprocessor manufactured by Cypress Microsystems located in Bothell, Wash.

The GFCI 120 also comprises a reset button 124 to manually reset contacts 18 and 20. The GFCI 120 does not include a manual test button because the GFCI device 100 automatically tests itself periodically. Additionally, the GFCI 120 employs a single drive circuit 121 to energize solenoid 15. The circuit 121 comprises a transistor 126 and a resistor 128. Additionally, a green LED 80 is in the emitter circuit of transistor 126 such that it receives power directly from the diode bridge 29, rather than from the microprocessor 122. The green LED 80 functions as an external indicator for the self test, as described below. All the other components ate the same as those described in connection with the GFCI 110 of FIG. 3.

In operation, the microprocessor 122 detects an actual fault via the outputs of the sense transformer 42 and the grounded neutral transformer 44 (detecting the imbalance in the current flow between the conductors 30, 32, 34, and 36 as described above in connection with FIG. 1). Specifically, the microprocessor 122 receives an input from the sense transformer 42 on I/O ports 134 and 136. The microprocessor 122 includes an internal operational amplifier that amplifies the signal received on I/O ports 134 and 136. The microprocessor 122 feeds this amplified signal to a window detector to determine whether a ground fault exists, in order to open contacts 18 and 20. A threshold voltage of the window detector is based upon the operating voltage. Specifically, the voltage regulator 138 for the microprocessor 122 operates at approximately 5 volts. Accordingly, the threshold voltages, in this case, are 1 volt for the lower threshold and 4 volts for the upper threshold, or 1.5 volts and 3.5 volts, respectively. If the microprocessor 122 determines that the amplified signal is less than the minimum threshold or exceeds the maximum threshold, the processor 122 initiates signaling to the single drive circuit 121 via port 130. For example, the amplified signal would drop below the threshold if a ground fault occurs when the incoming AC line voltage is going in the negative direction of the incoming sinusoidal line voltage. Alternatively, if the ground fault occurs when the incoming line voltage is going in the positive direction of the incoming sinusoidal line voltage, the amplified signal would be greater than the maximum threshold. The transistor 126 is gated off, thus de-energizing solenoid 15 to open contacts 18 and 20 in order to remove power from the load. The microprocessor 122 monitors the voltage on I/O port 132. If no voltage is present, the contacts 18 and 20 have opened. The user can activate the reset button 124 which allows the solenoid 15 to be energized via microprocessor 122. However, if a voltage is present, and the microprocessor 14 has attempted to have the contacts 18 and 20 held open for a sufficient period of time, the GFCI 120 is malfunctioning. In such a case, the red 73 LED flashes and the microprocessor 122 de-energizes solenoid 15 via port 130.

In the case of a microprocessor self-test, which occurs periodically, the microprocessor 14 gates SCR 72 via port 131 thereby creating an imbalance in the flux between conductors 30, 32, 34, and 36 (described above in connection with FIG. 1). The microprocessor 122 receives an input from the sense transformer 42 on I/O ports 134 and 136. The microprocessor 122 includes an internal operational amplifier that amplifies the signal received on I/O ports 134 and 136. The microprocessor 122 feeds this amplified signal to an internal window detector, as described above in connection with the manual test. The microprocessor 122 outputs a signal on line 130 to de-energize solenoid 15 and thereby opening contacts 18 and 20. The microprocessor monitors the voltage on I/O port 132 to determine if the power source has been removed from the load, as described above. If a voltage is present on I/O port 132, the microprocessor waits 100 msec. and repeats the test.

The microprocessor 122 performs the self-test up to four times, consecutively, and may still achieve a pass. However, if the microprocessor fails after a fourth test has been completed and has failed all four tests, the microprocessor automatically alerts the user of the condition by flashing red 80 LED and opening contacts 18 and 20.

Figure 5:
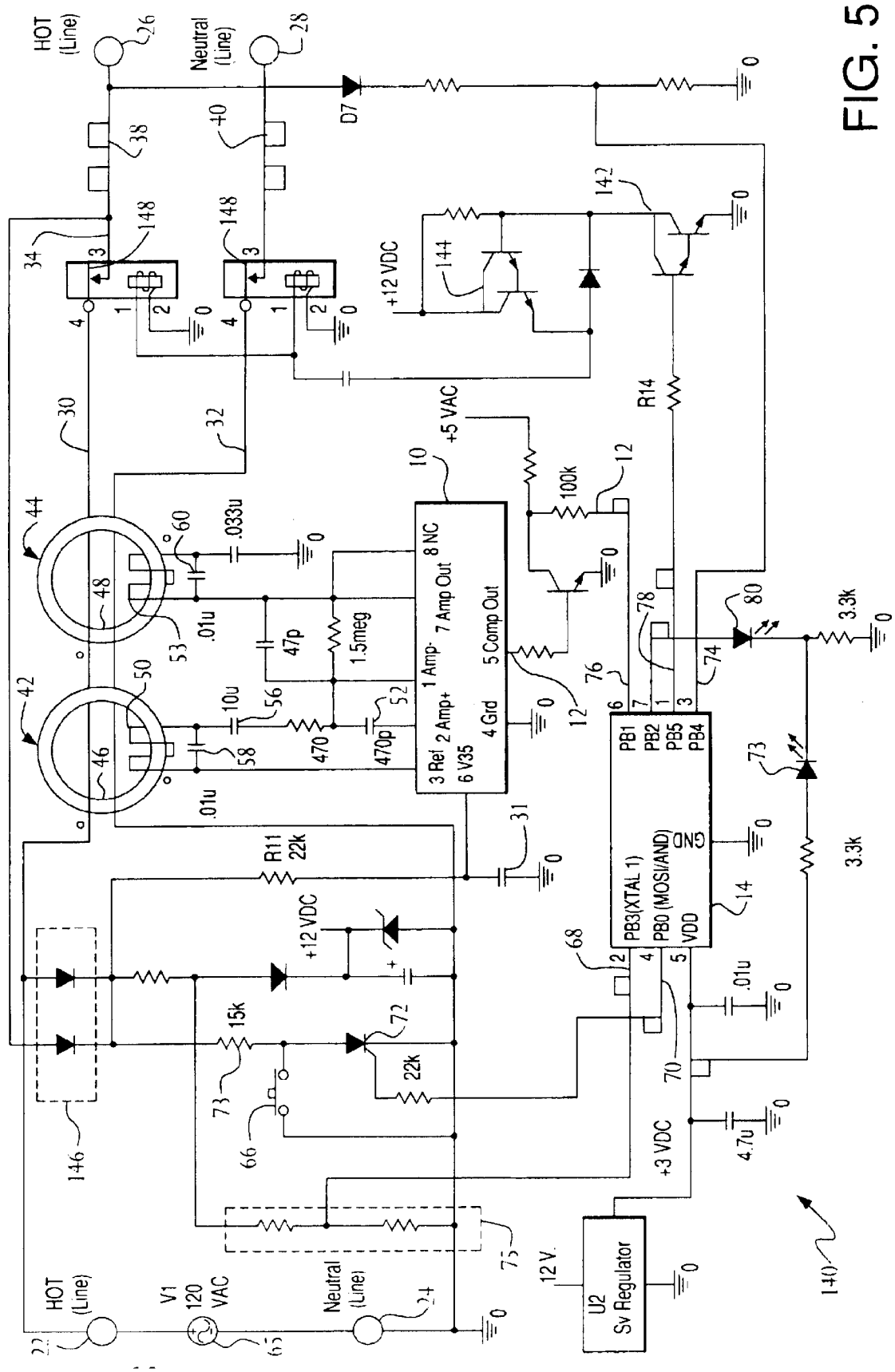
FIG. 5 is a schematic diagram of ground fault circuit interrupter in accordance with a fifth embodiment of the present invention, which employs a GFCI chip and a microprocessor, similar to FIGS. 1–3, except, the fifth embodiment employs a pair of relays or a double-pole double-throw relay to operate the GFCI.
Figure 1:
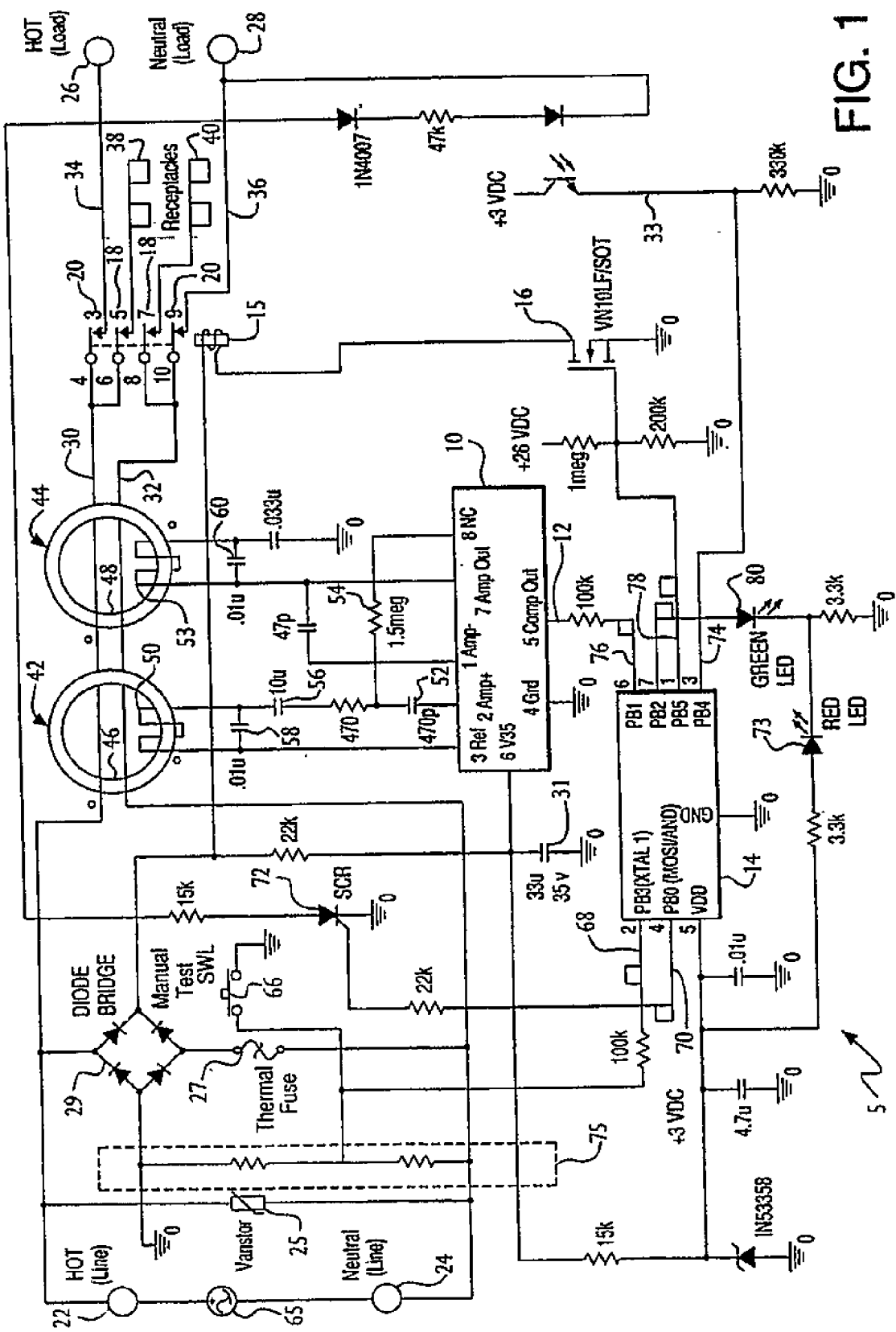
Figure 2:
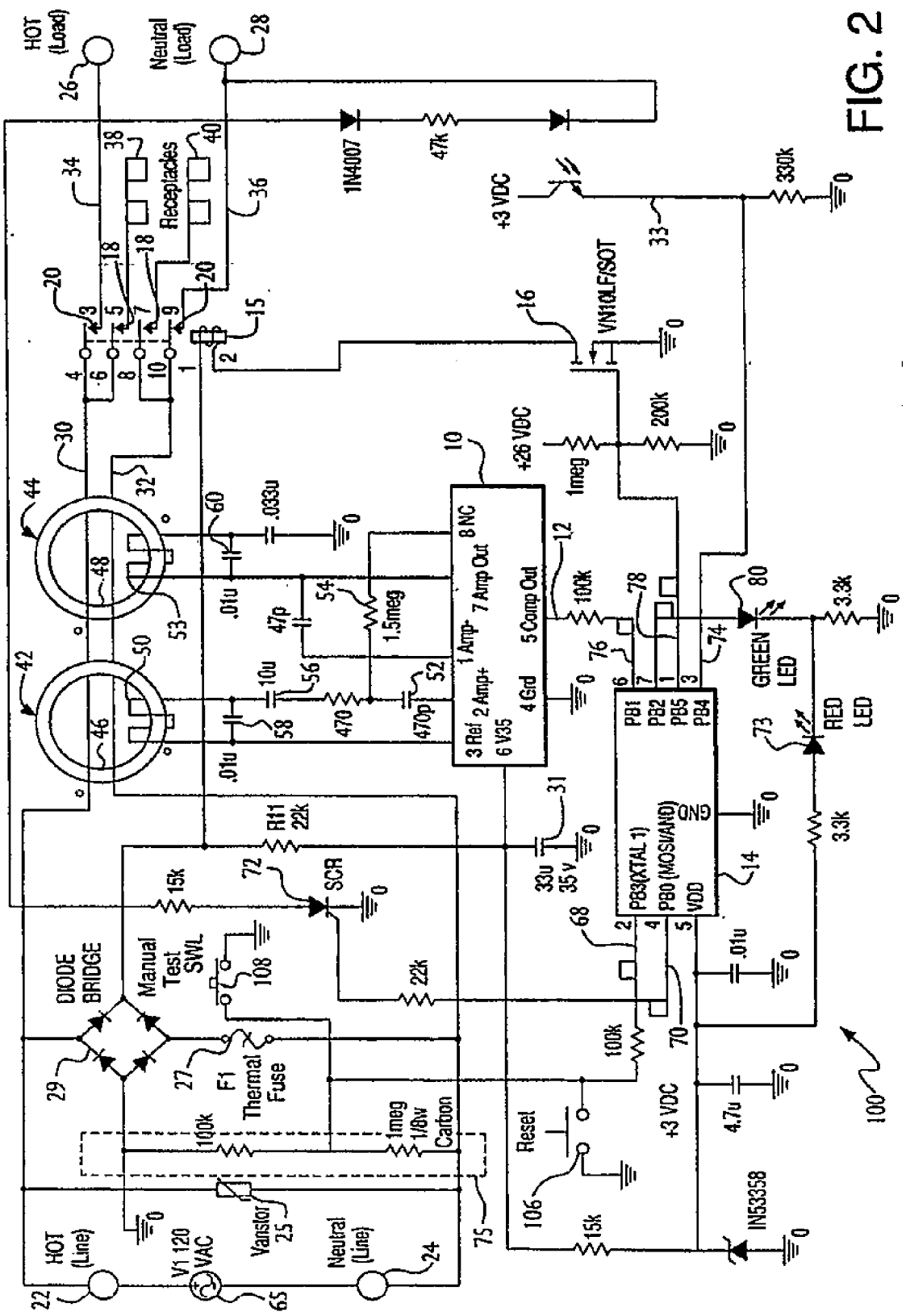
Figure 3:
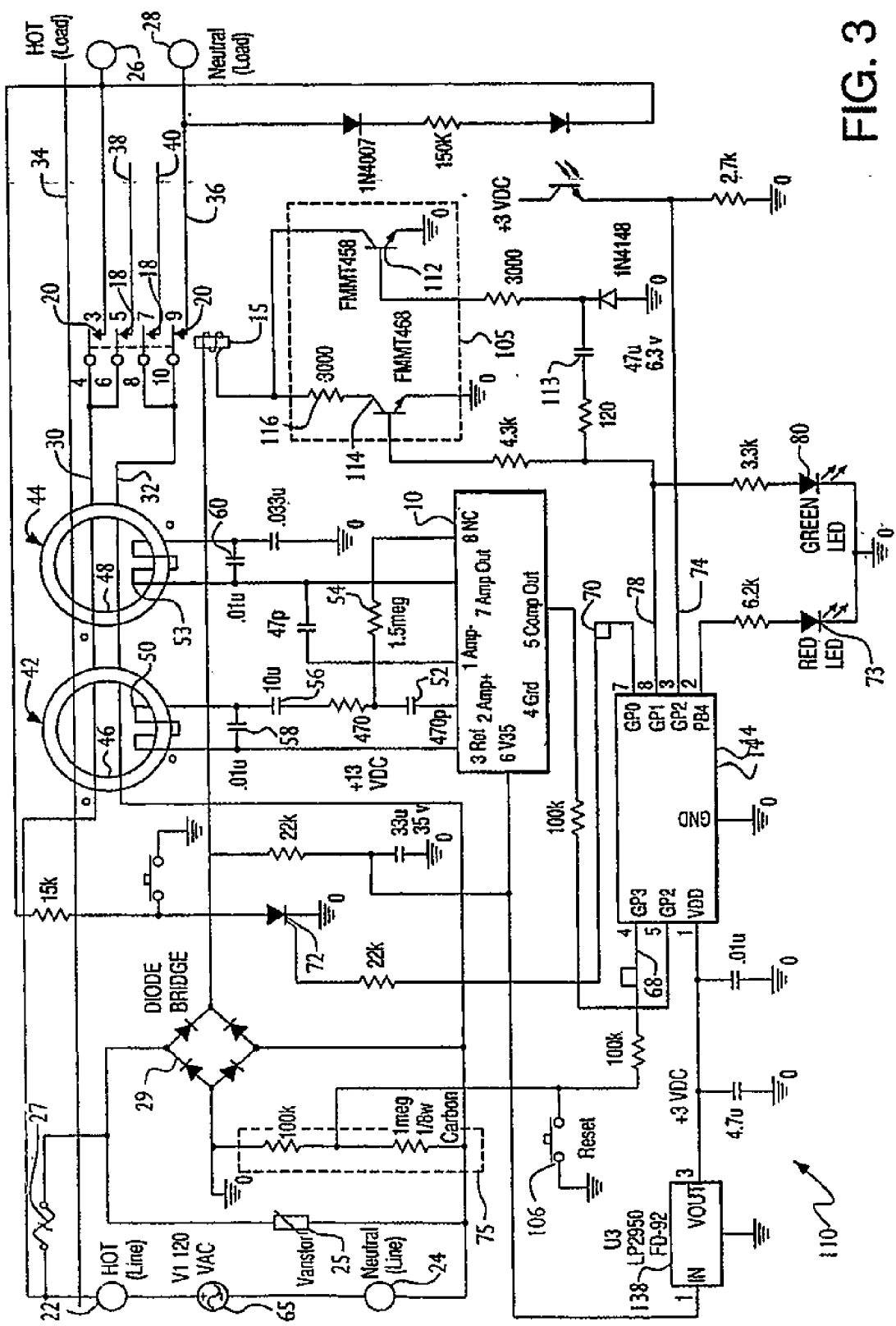
Figure 4:
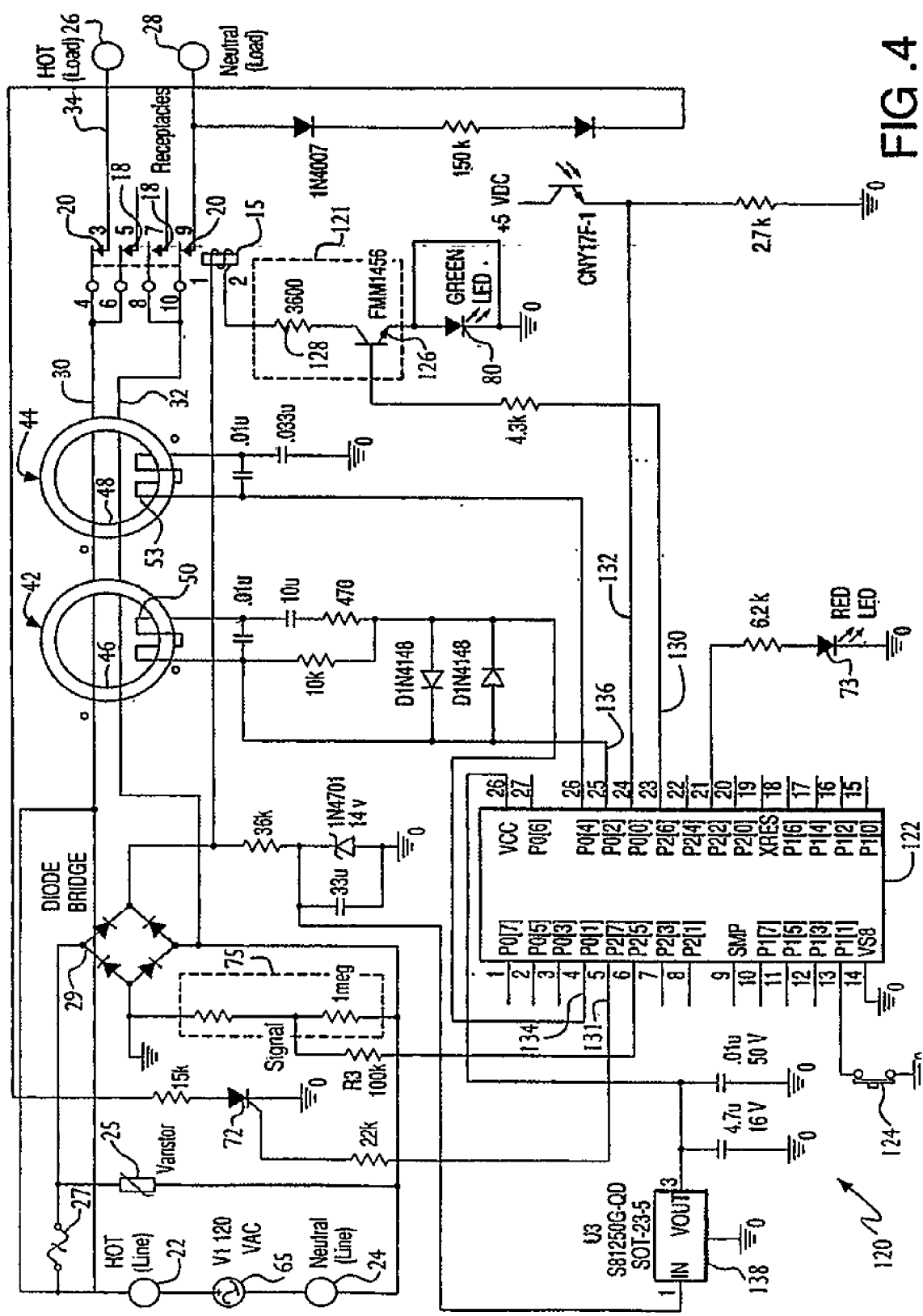
Figure 5:
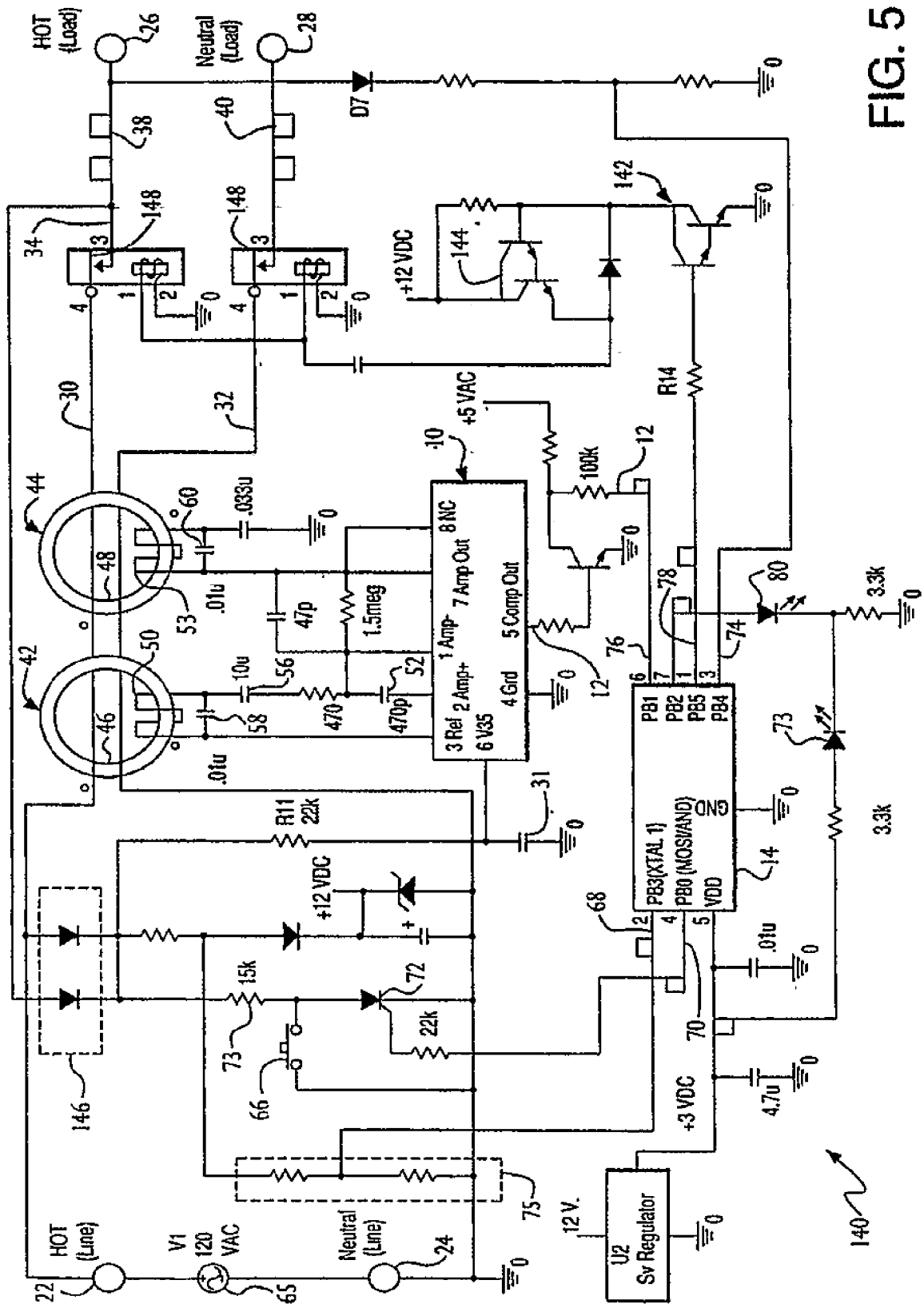

FIG. 5 depicts a GFCI 140 employing a separate GFCI chip 10 as in FIGS. 1–3, but with relays 148 in place of the discrete solenoid 15 and contacts 18 and 20. However, the GFCI 140 of FIG. 5 employs a half-wave input 146 as opposed to a full wave bridge as in FIGS. 1–4. The half wave rectifier 146 provides a half-wave rectified sinusoidal signal as its output. The GFCI 140 can employ a half-wave power supply due to the fact that the relays 148 can operate with low coil voltage on the order of approximately 12 volts, as opposed to the solenoid 15 of FIGS. 1–4 which operates at the line voltage of the incoming AC supply. Accordingly, the relays 48 does not requite a fully rectified sinusoidal voltage, but rather a half wave rectified voltage is sufficient. The half wave rectifier 146 is less expensive due to the fewer number of diodes required.

The GFCI 140 of FIG. 5 employs two sets of relays 148, as opposed to four sets of contacts as shown in the previous embodiments of the present invention in FIGS. 1–4. Accordingly, the GFCI 140 does not include any reverse wiring protection for the face contacts 38 and 40 as do the embodiments of FIGS. 1–4.

The manual test of GFCI 140 is preferably provided by activating manual test button 66 which creates a shunt across the SCR 72 thereby initiating a simulated ground fault detected by the GFCI chip 10 and microprocessor 14 as detailed above in connection with FIG. 2. The microcontroller 14 operates relays 148 via Darlington transistors 142 and 144. If the GFCI 140 does not pass the manual test the red LED 80 flashes and contacts 18 and 20 are opened. A self-test is initiated by the microprocessor 14 gating SCR 72 via line 70 and proceeding as explained above in connection with 2.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims and equivalents thereof.

Appendix

| | |
|---|---|
| Total time for Contacts to open and re-close | 16.7 msec. |
| Holding Force in Fully Pulled-In Position (d = 0") | 2.7 lbs. |
| Initial Pull Force when First Energized (d = .040") | 0.15 lbs. minimum |
| Stroke | 0.040" |
| Ambient Temperature | −35° C. to 66° C. |
| Required PC Board Area | Smaller than 1.00" by 0.65" |
| Coil Hot Spot Temperature | Less than 95° at 25° C. ambient |
| Coil Operation | Normal operation is continuously on; powered by a full wave rectified 120 VAC signal (+10%−15%) |

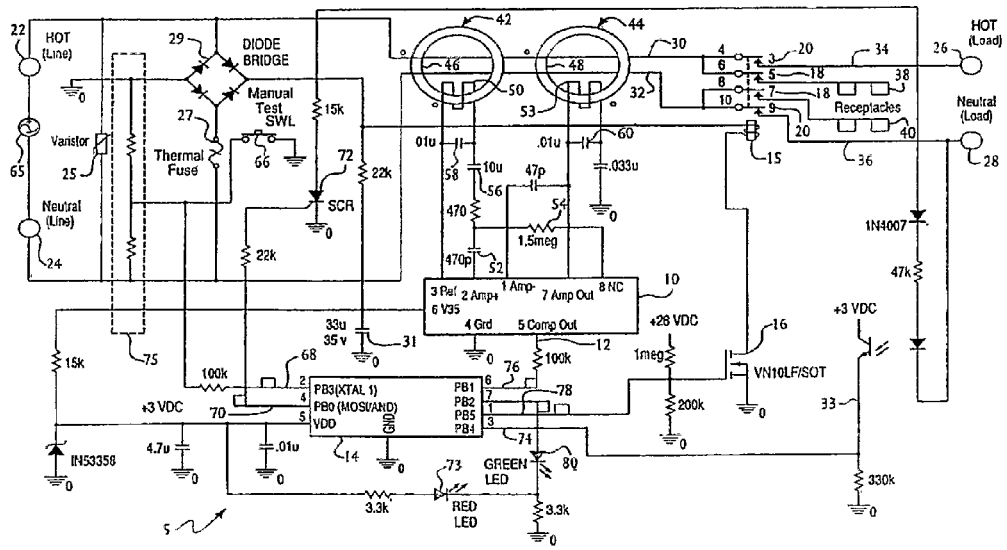

What is claimed is:

1. A fault interrupter apparatus comprising:
    first and second input terminals for connection to the line and neutral terminals, respectively, of a power source;
    first and second output terminals for connection to the line and neutral terminals, respectively, of a load;
    first and second conductive paths extending, between said first and second input terminals and said first and second output terminals;
    first and second contact sets for completing and interrupting said first and second conductive paths, respectively;
    an actuator for operating said first and second contact sets; and
    first and second electronic switching devices coupled to said actuator, said first electronic switching device being adapted to energize said actuator for a selected period of time, said second electronic switching device being adapted to commence energization of said actuator after said first electronic switching device ceases operation.

2. A fault interrupter apparatus as claimed in claim 1, further comprising:
    a fault sensing circuit adapted to produce a fault signal in response to an imbalance between current, flowing in said first and second conductive paths that is indicative of a ground fault condition at said load.

3. A fault interrupter apparatus as claimed in claim 1, wherein said actuator comprises a solenoid.

4. A fault interrupter apparatus as claimed in claim 1, wherein said second electronic switching device is energized in response to said first electronic switching device ceasing operation.

5. A fault interrupter apparatus as claimed in claim 1, wherein said first and second electronic switching devices comprise transistors.

6. A fault interrupter apparatus as claimed in claim 1, further comprising:
    a controller coupled to said first and second electronic switching devices.

7. A fault interrupter apparatus comprising:
    first and second input terminals for connection to the line and neutral terminals, respectively, of a power source;
    first and second output terminals for connection to the line and neutral terminals, respectively, of a load;
    first and second conductive paths extending, between said first and second input terminals and said first and second output terminals;
    first and second contact sets for completing and interrupting said first and second conductive paths, respectively;
    a fault sensing circuit adapted to produce a fault signal in response to the detection of a fault condition at said load; and
    a processing device coupled to an output of said fault sensing circuit for receiving said fault signal and for operating said first and second contact sets to open said respective first and second conductive paths.

8. A fault interrupter apparatus as claimed in claim 7, wherein said fault sensing circuit detects an imbalance between the current in said first and second conductive paths.

9. A fault interrupter apparatus as claimed in claim 7, wherein said fault sensing circuit comprises a ground fault circuit interrupter chip.

10. A fault interrupter apparatus as claimed in claim 7, wherein said processing device comprises a microprocessor.

11. A fault interrupter apparatus comprising:
    first and second input terminals for connection to the line and neutral terminals, respectively, of a power source;

first and second output terminals for connection to the line and neutral terminals, respectively, of a load;

first and second conductive paths extending, between said first and second input terminals and said first and second output terminals;

first and second contact sets for completing and interrupting said first and second conductive paths, respectively; and a processing device for operating said first and second contact sets in response to a plurality of input signals, wherein a single input of said processing device is adapted to receive more than one of said input signals.

12. A fault interrupter apparatus as claimed in claim 11, wherein one of said input signals comprises a test button signal.

13. A fault interrupter apparatus as claimed in claim 11, wherein one of said input signals comprises a line voltage signal.

14. A fault interrupter apparatus as claimed in claim 11, wherein one of said input signals comprises a fault signal.

15. A fault interrupter apparatus as claimed in claim 11, wherein one of said input signals comprises a load voltage signal.

16. A fault interrupter apparatus as claimed in claim 11, wherein said single input of said processing device receives a test button input signal and a line voltage signal.

17. A fault interrupter apparatus as claimed in claim 16, wherein the absence of said line voltage signal is interpreted by said processing device as said test button signal.

18. A fault interrupter apparatus comprising:

first and second input terminals for connection to the line and neutral terminals, respectively, of a power source;

first and second output terminals for connection to the line and neutral terminals, respectively, of a load;

first and second conductive paths extending, between said first and second input terminals and said first and second output terminals;

first and second contact sets for completing and interrupting said first and second conductive paths, respectively; and a controller for operating said first and second contact sets in response to the detection of a fault condition at said load, said controller being operative to periodically open said first and second contact sets to monitor a voltage at said load to verify that said first and second contact sets have opened, and to re-close said first and second contact sets after a predetermined period of time after verifying that said first and second contact sets have not re-closed, said predetermined period of time being extended by said controller if said first and second contact sets have not re-closed within said predetermined period of time.

19. A fault interrupter apparatus as claimed in claim 18, wherein said load comprises an inductive load.

20. A self-testing fault interrupter apparatus as claimed in claim 18, wherein said controller comprises a microprocessor.

21. A self-testing fault interrupter apparatus as claimed in claim 18, wherein said processing device produces an alarm indication if said contacts have not re-closed within a selected maximum extension of said pre-determined period of time.

22. A method for operating a fault interrupter apparatus having at least one set of contacts for interrupting the coupling of power to a load and an electrically driven actuator for operating said sets of contacts, said method comprising:

energizing said actuator with a first level of a drive current via a first current source for a selected period of time to cause said contacts to move from one of an open state or a closed state to the opposite state; and after said selected period of time, disabling said first current source and energizing said actuator with a second level of drive current via a second current source less than said first level of said drive current to maintain said contacts in said opposite state.

23. A method for operating a fault interrupter apparatus having at least one set of contacts for interrupting power delivery to a load, said method comprising:

periodically opening said contacts to interrupt power delivery to said load;

monitoring a voltage at said load to verify that said contacts have opened;

re-closing said contacts after a pre-determined period of time after verifying that said contacts have opened; and extending said pre-determined period of time if said contacts have not re-closed within said pre-determined period of time.

24. A method for operating a fault interrupter apparatus as claimed in claim 23, said method further comprising:

producing an alarm indication if said contacts have not re-closed within a selected maximum extension of said predetermined period of time.

* * * * *

UNITED STATES PATENT AND TRADEMARK OFFICE
CERTIFICATE OF CORRECTION

PATENT NO. : 6,807,036 B2
APPLICATION NO. : 10/087125
DATED : October 19, 2004
INVENTOR(S) : John R. Baldwin It is certified that error appears in the above-identified patent and that said Letters Patent is hereby corrected as shown below:

The Title Page showing an illustrative Fig. should be deleted and substitute therefore the attached title page.

For Figs. 1-5, please substitute the attached drawing sheets which label terminals 26 and 28 as load terminals.

Signed and Sealed this

Twenty-sixth Day of December, 2006

JON W. DUDAS
*Director of the United States Patent and Trademark Office*

(12) United States Patent
Baldwin

(10) Patent No.: US 6,807,036 B2
(45) Date of Patent: Oct. 19, 2004

(54) DIGITAL FAULT INTERRUPTER WITH SELF-TESTING CAPABILITIES

(75) Inventor: John R. Baldwin, Newtown, CT (US)

(73) Assignee: Hubbell Incorporated, Orange, CT (US)

( * ) Notice: Subject to any disclaimer, the term of this patent is extended or adjusted under 35 U.S.C. 154(b) by 131 days.

(21) Appl. No.: 10/087,125

(22) Filed: Mar. 4, 2002

(65) Prior Publication Data

US 2002/0181175 A1 Dec. 5, 2002

Related U.S. Application Data

(60) Provisional application No. 60/286,372, filed on Apr. 26, 2001, and provisional application No. 60/312,344, filed on Aug. 16, 2001.

(51) Int. Cl.$^7$ ................................................. H02H 3/00
(52) U.S. Cl. ..................................................... 361/42
(58) Field of Search ........................... 361/42–50, 93.1, 361/93.2, 93.4, 93.5, 93.6, 71–73

(56) References Cited

U.S. PATENT DOCUMENTS

| | | | |
|---|---|---|---|
| 3,932,790 A | 1/1976 | Muchnick | 317/18 |
| 3,936,699 A | 2/1976 | Adams | 317/18 |
| 3,976,918 A | 8/1976 | Clark | 317/18 D |
| 4,024,436 A | 5/1977 | Adams | 361/45 |
| 4,045,822 A | 8/1977 | Schade, Jr. | 361/45 |
| 4,063,299 A | 12/1977 | Munroe | 361/45 |
| 4,345,289 A | 8/1982 | Howell | 361/45 |
| 4,368,498 A | 1/1983 | Neuhouser | 361/48 |
| 4,412,193 A | 10/1983 | Bienwald et al. | 335/18 |
| 4,538,040 A | 8/1985 | Ronemus et al. | 200/159 |
| 4,567,544 A | 1/1986 | Ronemus et al. | 361/399 |
| 4,568,997 A | 2/1986 | Bienwald et al. | 361/45 |
| 4,574,324 A | 3/1986 | Packard | 361/46 |
| 4,595,894 A | 6/1986 | Doyle et al. | 335/18 |
| 4,618,907 A | 10/1986 | Leopold | 361/45 |
| 4,709,293 A | 11/1987 | Gershen et al. | 361/50 |
| 4,742,422 A | 5/1988 | Tigges | 361/45 |
| 4,802,052 A | 1/1989 | Brant et al. | 361/42 |
| 4,831,496 A | 5/1989 | Brant et al. | 361/394 |
| 4,872,087 A | 10/1989 | Brant | 361/356 |
| 4,939,615 A | 7/1990 | Brant et al. | 361/42 |
| 5,166,853 A | 11/1992 | Gershen et al. | 361/50 |
| 5,184,271 A | 2/1993 | Doyle et al. | 361/49 |
| 5,202,662 A | 4/1993 | Bienwald et al. | 335/18 |
| 5,223,810 A | 6/1993 | Van Haaren | 335/18 |
| 5,270,896 A | 12/1993 | McDonald | 361/45 |
| 5,270,897 A | 12/1993 | McDonald et al. | 361/45 |
| 5,334,939 A | 8/1994 | Yarbrough | 324/424 |
| 5,363,269 A | 11/1994 | McDonald | 361/45 |
| 5,402,298 A | 3/1995 | Gershen et al. | 361/50 |
| 5,406,436 A | 4/1995 | Doyle et al. | 361/50 |
| 5,418,678 A | 5/1995 | McDonald | 361/46 |
| 5,477,412 A | 12/1995 | Neiger et al. | 361/45 |
| 5,510,760 A | 4/1996 | Marcou et al. | 335/18 |
| 5,541,800 A | 7/1996 | Misencik | 361/45 |

(List continued on next page.)

FOREIGN PATENT DOCUMENTS

| | | | |
|---|---|---|---|
| DE | 4205208 | 8/1993 | H02H/3/33 |
| WO | 0074192 | 12/2000 | H02H/3/00 |

OTHER PUBLICATIONS

"RV4145A Low Power Ground Fault Interrupter", Product Specification Revision 1.0.2, Fairchild Semiconductor Corporation (1998), no month.

* cited by examiner

*Primary Examiner*—Ronald Leja
(74) *Attorney, Agent, or Firm*—Alfred N. Goodman; John E. Holmes; Stacey J. Longanecker

(57) ABSTRACT

A ground fault interrupter apparatus is provided that employs a switching device that is operated in two stages. The first stage operates a solenoid in order to close the contacts and preferably provides coupling between the load and the power source. The second stage maintains the coupling, however, drawing less current and power from the internal devices of the apparatus. Accordingly, the fault interrupter meets various standards for the time required to open and close the contacts as well as keeping the dissipated heat from the device within the required range.

24 Claims, 5 Drawing Sheets